United States Patent
Harada et al.

(10) Patent No.: US 11,808,718 B2
(45) Date of Patent: Nov. 7, 2023

(54) X-RAY ANALYZER AND X-RAY ANALYSIS METHOD

(71) Applicant: Shimadzu Corporation, Kyoto (JP)

(72) Inventors: Daisuke Harada, Kyoto (JP); Yasuyuki Keyaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 21 days.

(21) Appl. No.: 17/521,404

(22) Filed: Nov. 8, 2021

(65) Prior Publication Data
US 2022/0283101 A1 Sep. 8, 2022

(30) Foreign Application Priority Data
Mar. 3, 2021 (JP) .................. 2021-033776

(51) Int. Cl.
*G01N 23/046* (2018.01)

(52) U.S. Cl.
CPC .................. *G01N 23/046* (2013.01)

(58) Field of Classification Search
CPC ............ G01N 23/046; G01N 2223/401; G06T 11/005; A61B 6/08; A61B 6/583; A61B 6/4007; A61B 6/025; A61B 6/06; A61B 6/4021; H05G 1/00; G21K 1/02
See application file for complete search history.

(56) References Cited

U.S. PATENT DOCUMENTS

| | | | |
|---|---|---|---|
| 2007/0122020 A1* | 5/2007 | Claus | G06T 11/005 382/131 |
| 2009/0074136 A1 | 3/2009 | Kamegawa | |
| 2016/0270745 A1* | 9/2016 | Heath | A61B 6/4007 |

FOREIGN PATENT DOCUMENTS

WO  2006/051690 A1  5/2006

\* cited by examiner

*Primary Examiner* — David P Porta
*Assistant Examiner* — Mamadou Faye
(74) *Attorney, Agent, or Firm* — Maier & Maier, PLLC

(57) ABSTRACT

An X-ray analyzer has a configuration including an X-ray source, an X-ray detector configured to detect an X-ray irradiated from the X-ray source, a rotary stage (stage) disposed between the X-ray source and the X-ray detector, and configured to hold an imaging target, and a light irradiation mechanism configured to irradiate light coaxially with an X-ray optical axis of the X-ray irradiated from the X-ray source to project a shadow of the imaging target onto a position of the X-ray detector.

8 Claims, 1 Drawing Sheet

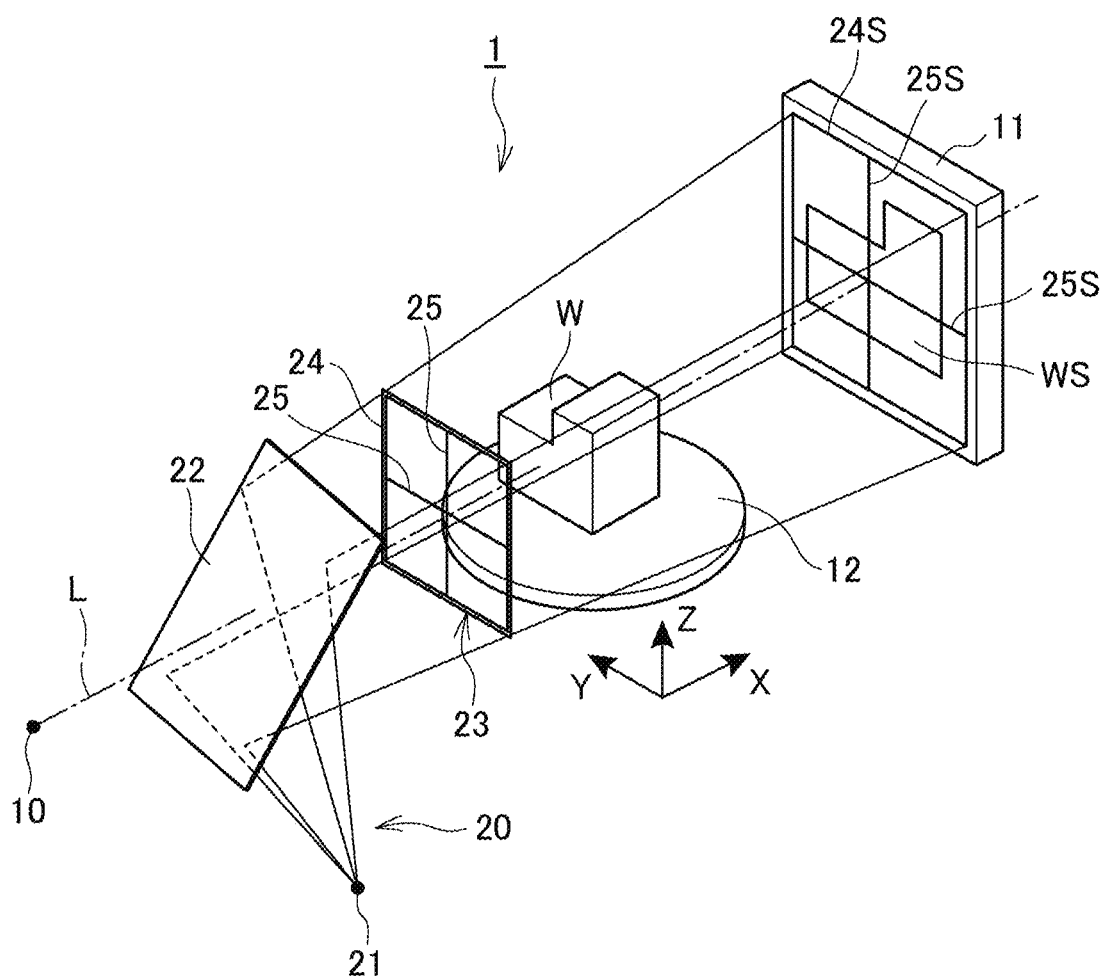

X-RAY ANALYZER AND X-RAY ANALYSIS METHOD

INCORPORATION BY REFERENCE

The present application claims priority under 35 U.S.C. § 119 to Japanese Patent Application No. 2021-033776 filed on Mar. 3, 2021. The content of the application is incorporated herein by reference in its entirety.

FIELD

The present invention relates to an X-ray analyzer and an X-ray analysis method.

BACKGROUND

In an industrial X-ray CT apparatus, generally, a rotary stage that rotates about an axis orthogonal to an X-ray optical axis is disposed between an X-ray source and an X-ray detector that are disposed to face each other, and while the X-ray is being irradiated in a state in which an imaging target is held on the rotary stage, X-ray transmission data from the X-ray detector is loaded whenever the rotary stage is made to rotate by a predetermined minute angle.

In this case, the industrial X-ray CT apparatus is demanded to capture CT images of imaging targets respectively having various sizes and shapes, and the imaging target has to be set at an appropriate position every time. In a case where positioning of the imaging target is inappropriate, the point of interest is out of the range of a CT imaging visual field, and it is found after the CT imaging that the part to be desired to observe originally is not included in a cross-sectional image, thereby leading to a case where re-imaging is needed.

Hence, in order to confirm whether the imaging target is included in a CT imaging visual field range, conventionally, a method for irradiating an X-ray to confirm from a fluoroscopic image or capturing a CT image once under a simple condition has been used.

However, in a case where the position of the imaging target is confirmed from the X-ray fluoroscopic image or the CT imaging result, it is necessary to close the door once after setting the imaging target. For such a reason, in a case where a mechanism for positioning the imaging target is not provided in the CT apparatus, it is necessary to open the door again in order to position the imaging target, and then position the imaging target. This takes much time and effort.

Therefore, conventionally, for example, a technique has been disclosed in which an image of the imaging target placed on the rotary stage is captured by an optical camera, the shape and size of the imaging target and position information with respect to a rotation axis are obtained by image processing using the data, and interference between the imaging target and an X-ray source is monitored, based on the obtained information, or the rotary stage is automatically positioned at a position closest to the X-ray source without interference (see, for example, WO 2006/051690 A).

SUMMARY

In the above-described conventional technique, however, the rotary stage is positioned, based on the image that has been captured by the optical camera from above the imaging target. Hence, it is difficult to position the imaging range of the imaging target that completely matches an X-ray transmission image obtained when the imaging target is irradiated with the X-ray.

In particular, in the technique called offset scanning of shifting the X-ray detector in the lateral direction for capturing the CT image, only about a half the CT imaging visual field range in which the X-ray transmission image is actually captured can be obtained. Hence, it is not easy to confirm the CT imaging visual field range from the fluoroscopic image.

The present invention has an object to provide an X-ray analyzer and an X-ray analysis method capable of easily and accurately positioning an imaging target for obtaining an X-ray transmission image.

A first aspect of the present invention is an X-ray analyzer including: an X-ray source; an X-ray detector configured to detect an X-ray irradiated from the X-ray source; a stage disposed between the X-ray source and the X-ray detector, and configured to hold an imaging target; and a light irradiation mechanism configured to irradiate light coaxially with an X-ray optical axis of the X-ray irradiated from the X-ray source to project a shadow image of the imaging target onto a position of the X-ray detector.

According to the first aspect of the present invention, the shadow image of the imaging target is formed by the light irradiation mechanism. Thus, by visually observing the shadow image of the imaging target, the area of the imaging target irradiated with the X-ray can be confirmed, and positioning of the imaging target can be conducted easily and accurately. Therefore, also in the case of the offset scanning, the positioning of the imaging target can be conducted easily and accurately.

BRIEF DESCRIPTION OF DRAWINGS

FIG. 1 is a perspective view illustrating a schematic configuration of an X-ray analyzer according to an embodiment of the present invention.

DETAILED DESCRIPTION

Hereinafter, embodiments of the present invention will be described with reference to the drawings.

In the present embodiment, an example in which the present invention is applied to an X-ray CT apparatus as an X-ray analyzer will be described.

FIG. 1 is a perspective view schematically illustrating an X-ray CT apparatus according to the present embodiment.

As illustrated in FIG. 1, an X-ray CT apparatus 1 includes an X-ray source 10 (X-ray tube) that irradiates an imaging target W with an X-ray, and an X-ray detector 11 (sensor) that detects the X-ray irradiated from the X-ray source 10.

A rotary stage 12 as a stage for applying rotation to the imaging target W is disposed between the X-ray source 10 and the X-ray detector 11. The rotary stage 12 is rotationally driven about a rotation axis in z-axis direction orthogonal to x-axis direction along an X-ray optical axis L from the X-ray source 10, and is configured to be movable in x-axis direction.

In the CT imaging, in a state in which the imaging target W is placed on the rotary stage 12, the rotary stage 12 is made to rotate, while the X-ray is being irradiated from the X-ray source 10, so that X-ray transmission data from the X-ray detector 11 is acquired at every minute rotation angle, and a tomographic image of the imaging target W is obtained using the X-ray transmission data, which has been acquired and which covers 360 degrees, of the imaging target W.

In addition, in the present embodiment, a light irradiation mechanism 20 for irradiating the imaging target W with light is provided.

In the present embodiment, the light irradiation mechanism 20 includes a light source 21 that irradiates visible light such as white light, a reflection plate 22, and a marker member 23.

The light source 21 irradiates the visible light, which is for example, a light emitting element such as Light Emitting Diode (LED) or a lamp. The reflection plate 22 is formed of, for example, a resin such as acrylic resin, and reflects the light irradiated from the light source 21 in x-axis direction that is the X-ray optical axis L. The light that has been reflected by the reflection plate 22 passes through the marker member 23, and is irradiated to the imaging target W.

The light source 21 is installed at a position where the size of a shadow of the imaging target W to be formed and the X-ray transmission image of the imaging target W to be formed by the X-ray irradiated from the X-ray source 10 to the imaging target W become the same size, when the light irradiated from the light source 21 is reflected by the reflection plate 22, is irradiated to the imaging target W, and is projected as the shadow onto the X-ray detector 11.

Thus, by irradiating the imaging target W with the light from the light source 21, it is possible to project a shadow image WS same with the X-ray transmission image obtained when the X-ray detector 11 is irradiated with the X-ray. Therefore, by visually observing the shadow image WS of the imaging target W projected by the irradiation light from the light source 21, the range in which the X-ray transmission image is acquired can be confirmed.

Note that regarding the light source 21, light of another color may be used instead of the white light, or laser light may be used.

In addition, in the present embodiment, the marker member 23 is disposed between the reflection plate 22 and the rotary stage 12. The marker member 23 is formed of, for example, a transparent resin, and a quadrangular outer marker 24 and a substantially cross-shaped inner marker 25 located inside the outer marker 24 are formed on the marker member 23 by printing or the like.

The outer marker 24 is formed in an imaging visual field range of the X-ray transmission image, which is obtained by the X-ray irradiation, of the imaging target W. The inner marker 25 is formed such that a point of intersection of the cross shape is located on the X-ray optical axis L.

Note that instead of the marker member 23, a pattern such as the marker member may be printed on the surface of the reflection plate 22 to confirm the imaging visual field range formed by the X-ray, or a pattern such as the marker member may be projected using the light source 21 as a laser light source to confirm the imaging visual field range formed by the X-ray.

Then, the light from the light source 21 via the reflection plate 22 is irradiated, and a shadow 24S of the outer marker 24 and a shadow 25S of the inner marker 25 of the marker member 23 are formed on the X-ray detector 11. The X-ray transmission image of the imaging target W obtained by irradiating the imaging target W with the X-ray from the X-ray source 10 is formed in a range surrounded by the outer marker 24. Thus, the shadow image WS of the projected imaging target W is located in the range of the shadow 24S of the outer marker 24, which has been projected onto the X-ray detector 11, so that the imaging target W being included in the CT imaging visual field area can be confirmed.

In addition, in a case of offset imaging, the entire imaging target is not irradiated with the X-ray from the X-ray source. Accordingly, even when the imaging target is irradiated with the light from the light source in an offset state, the shadow image of the entire imaging target cannot be obtained.

For such a reason, in the case of the above offset imaging, for example, a screen or the like is installed on the side, where the X-ray is not offset, of the detection surface of the X-ray detector, and the setting is also made so that the light from the light source passes through substantially the center of the imaging target. In this state, by irradiating the imaging target with the light from the light source, it becomes possible to confirm whether the imaging target is included in the CT imaging visual field area at the time of the offset imaging.

Note that in the present embodiment, the light irradiation mechanism 20 is configured to irradiate the imaging target W with the light from the light source 21 via the reflection plate 22. However, the present invention is not limited to this configuration.

For example, the light source 21 may be arranged on the X-ray optical axis L, and the light source 21 may directly irradiate the imaging target W with the light, so that the shadow image WS of the imaging target W may be projected. In this case, the light source 21 becomes an obstacle when the imaging target W is irradiated with the X-ray. Hence, it is necessary to have a structure to escape the light source 21, when the imaging target W is irradiated with the X-ray.

Next, an X-ray analysis method according to the present invention using the X-ray CT apparatus 1 will be described.

First, a predetermined imaging target W is placed on the rotary stage 12.

In this state, light is irradiated from the light source 21. The light irradiated from the light source 21 is reflected by the reflection plate 22, passes through the marker member 23, and is irradiated to the imaging target W.

Accordingly, the shadow image WS of the imaging target W is projected onto the X-ray detector 11. In this state, the rotary stage 12 is made to rotate by 360 degrees to project the shadow image WS of the imaging target W covering 360 degrees. In this situation, the shadow of the outer marker 24 and the shadow of the inner marker 25 of the marker member 23 are also projected onto the X-ray detector 11. Note that the angle at which the rotary stage 12 is made to rotate is not limited to 360 degrees, and is appropriately set by a person who captures an image depending on the imaging target, for example, 180 degrees, 90 degrees, or the like.

A user visually recognizes the shadow image WS of the imaging target W to be able to visually recognize whether the imaging target W is located inside the outer marker 24 of the marker member 23, and visually recognizes the shadow image WS of the imaging target W projected by the irradiation light from the light source 21 to be able to confirm the range in which the X-ray transmission image is acquired.

Then, by confirming the shadow image WS of the imaging target W, the user correctly places the imaging target W on the rotary stage 12.

After that, the X-ray is irradiated from the X-ray source 10 to the imaging target W, and such X-ray is detected by the X-ray detector 11, so that the predetermined X-ray transmission image can be obtained.

According to the present embodiment, the following effects are brought about.

The X-ray CT apparatus 1 in the present embodiment has a configuration including the X-ray source 10, the X-ray detector 11 that detects the X-ray irradiated from the X-ray source 10, the rotary stage 12 (stage) that is disposed between the X-ray source 10 and the X-ray detector 11 and that holds the imaging target W, and the light irradiation mechanism 20 that irradiates the light coaxially with the X-ray optical axis L of the X-ray irradiated from the X-ray source 10 to project a shadow of the imaging target W onto a position of the X-ray detector 11.

With this configuration, the light irradiation mechanism 20 forms the shadow image WS of the imaging target W. Thus, by visually observing the shadow image WS of the imaging target W, the shadow image WS being included in an area of the CT imaging visual field range can be confirmed. Therefore, the area of the imaging target W irradiated with the X-ray can be confirmed, and the positioning of the imaging target W can be conducted easily and accurately.

Further, also in the case of the offset imaging, the screen or the like is installed, the light from the light source is set to pass through substantially the center of the imaging target, and the imaging target is irradiated with the light from the light source, so that whether the imaging target at the time of the offset imaging is included in the CT imaging visual field area can be confirmed. Therefore, also in the case of the offset scanning, the positioning of the imaging target W can be conducted easily and accurately.

In the X-ray CT apparatus 1 in the present embodiment, the shadow image WS of the imaging target W projected by the light that has been irradiated from the light irradiation mechanism 20 is configured to indicate an area constituted by the X-ray transmission image of the imaging target W formed by the X-ray irradiated from the X-ray source 10.

With this configuration, the shadow image WS of the imaging target W projected by the irradiation light from the light irradiation mechanism 20 is configured to indicate the area constituted by the X-ray transmission image of the imaging target W formed by the X-ray irradiated from the X-ray source 10, so that the area of the imaging target W irradiated with the X-ray can be confirmed reliably, and the positioning of the imaging target W can be conducted easily and accurately.

In the X-ray CT apparatus 1 in the present embodiment, the light irradiation mechanism 20 has a configuration including the light source 21 that irradiates the visible light, and the reflection plate 22 that reflects the light irradiated from the light source 21 coaxially with the X-ray optical axis L to irradiate the imaging target W with the light.

With this configuration, the imaging target W can be irradiated with the irradiation light from the light source 21 via the reflection plate 22, and the shadow image WS of the imaging target W can be projected onto the X-ray detector 11.

In the X-ray CT apparatus 1 in the present embodiment, the marker member 23 is disposed between the reflection plate 22 and the imaging target W.

With this configuration, by visually confirming the position corresponding to the marker member 23 onto which the projected imaging target W has been projected, whether the imaging target W is located at a correct position can be determined.

Note that the above-described embodiments are merely examples according to one aspect of the present invention, and can be optionally modified and applied without departing from the gist of the present invention.

Further, unless otherwise specified, the directions such as horizontal and vertical, various numerical values, and shapes in the above-described embodiments include a range (a so-called equivalent range) in which the same effects as those directions, numerical values, and shapes are exhibited.

[Aspects]

It will be understood by those skilled in the art that the above-described exemplary embodiments and modifications are specific examples of the following aspects.

(First item) An X-ray analyzer according to one aspect includes an X-ray source, an X-ray detector configured to detect an X-ray irradiated from the X-ray source, a stage disposed between the X-ray source and the X-ray detector, and configured to hold an imaging target (W), and a light irradiation mechanism configured to irradiate light coaxially with an X-ray optical axis of the X-ray irradiated from the X-ray source to project a shadow image of the imaging target onto a position of the X-ray detector.

According to an aspect of the first item, the shadow image of the imaging target is formed by the light irradiation mechanism. Thus, by visually observing the shadow image of the imaging target, the area of the imaging target irradiated with the X-ray can be confirmed, and the positioning of the imaging target can be conducted easily and accurately. Therefore, also in the case of the offset scanning, the positioning of the imaging target can be conducted easily and accurately.

(Second item) In the X-ray analyzer described in the first item, the shadow image of the imaging target projected by the light irradiated from the light irradiation mechanism may indicate an area constituted by an X-ray transmission image of the imaging target formed by the X-ray irradiated from the X-ray source.

According to an aspect of the second item, the shadow image of the imaging target projected with the irradiation light from the light irradiation mechanism indicates the area constituted by the X-ray transmission image of the imaging target formed by the X-ray irradiated from the X-ray source, so that the area of the imaging target irradiated with the X-ray can be reliably confirmed, and the positioning of the imaging target W can be conducted easily and accurately.

(Third item) In the X-ray analyzer described in the first item or the second item, the light irradiation mechanism may include a light source configured to irradiate visible light, and a reflection plate configured to reflect the light irradiated from the light source coaxially with the X-ray optical axis to irradiate the imaging target with the light.

According to an aspect of the third item, the imaging target can be irradiated with the irradiation light from the light source via the reflection plate, and the shadow image of the imaging target can be projected onto the X-ray detector.

(Fourth item) In the X-ray analyzer described in the third item, a marker member may be disposed between the reflection plate and the imaging target.

According to an aspect of the fourth item, by visually confirming the position corresponding to the marker member onto which the projected imaging target is projected, whether the imaging target is located at a correct position can be determined.

(Fifth item) In the X-ray analyzer described in any one of the first to fourth items, the X-ray analyzer may be an X-ray CT apparatus.

According to an aspect of the fifth item, as the X-ray analyzer, it is applicable to an X-ray CT apparatus.

(Sixth item) An X-ray analysis method according to one aspect includes irradiating an imaging target held on a stage with an X-ray from an X-ray source, detecting the X-ray transmitted through the imaging target on an X-ray detector to analyze the imaging target, and irradiating light from a light irradiation mechanism coaxially with an X-ray optical axis of the X-ray irradiated from the X-ray source to project a shadow image of the imaging target onto a position of the X-ray detector so as to visually confirm from the shadow image of the imaging target whether the imaging target is included in an imaging visual field range formed by the X-ray.

According to an aspect of the sixth item, the shadow image of the imaging target is formed by the light irradiation mechanism. Therefore, by visually observing the shadow image of the imaging target, the area of the imaging target irradiated with the X-ray can be confirmed, and the positioning of the imaging target can be conducted easily and accurately.

REFERENCE SINGS LIST

1 X-ray CT apparatus
10 X-ray source
11 X-ray detector
12 rotary stage
20 light irradiation mechanism
21 light source
22 reflection plate
23 marker member
24 outer marker
25 inner marker
W imaging target
L X-ray optical axis
WS shadow image

What is claimed is:

1. An X-ray analyzer comprising:
   an X-ray source;
   an X-ray detector configured to detect an X-ray irradiated from the X-ray source;
   a stage disposed between the X-ray source and the X-ray detector, and configured to hold an imaging target; and
   a visible light irradiation mechanism configured to irradiate visible light coaxially with an X-ray optical axis of the X-ray irradiated from the X-ray source to project a shadow image of the imaging target onto a position of the X-ray detector.

2. The X-ray analyzer according to claim 1, wherein the shadow image of the imaging target projected by the light irradiated from the light irradiation mechanism indicates an area constituted by an X-ray transmission image of the imaging target formed by the X-ray irradiated from the X-ray source.

3. The X-ray analyzer according to claim 1, wherein the light irradiation mechanism includes: a light source configured to irradiate visible light; and a reflection plate configured to reflect the light irradiated from the light source coaxially with the X-ray optical axis to irradiate the imaging target with the light.

4. The X-ray analyzer according to claim 3, wherein a marker member is disposed between the reflection plate and the imaging target.

5. The X-ray analyzer according to claim 1, wherein the X-ray analyzer is an X-ray CT apparatus.

6. An X-ray analysis method comprising:
   irradiating an imaging target held on a stage with an X-ray from an X-ray source;
   detecting the X-ray transmitted through the imaging target on an X-ray detector to analyze the imaging target; and
   irradiating light from a light irradiation mechanism coaxially with an X-ray optical axis of the X-ray irradiated from the X-ray source to project a shadow image of the imaging target onto a position of the X-ray detector so as to visually confirm from the shadow image of the imaging target whether the imaging target is included in an imaging visual field range formed by the X-ray.

7. The X-ray analyzer according to claim 1, comprising a marker member, including an outer marker and a cross-shaped inner marker inside the outer marker, disposed between the light irradiation source and the imaging target and configured to project a shadow image of the marker member on the X-ray detector.

8. The X-ray analyzer according to claim 1, wherein the light source is installed at a position where the size of a shadow of the imaging target to be formed and the X-ray transmission image of the imaging target to be formed by the X-ray irradiated from the X-ray source to the imaging target become the same size.

* * * * *